(No Model.) 3 Sheets—Sheet 3.
C. H. FITCH.
PRESCRIPTION WEIGHING SCALE.
No. 384,247. Patented June 12, 1888.
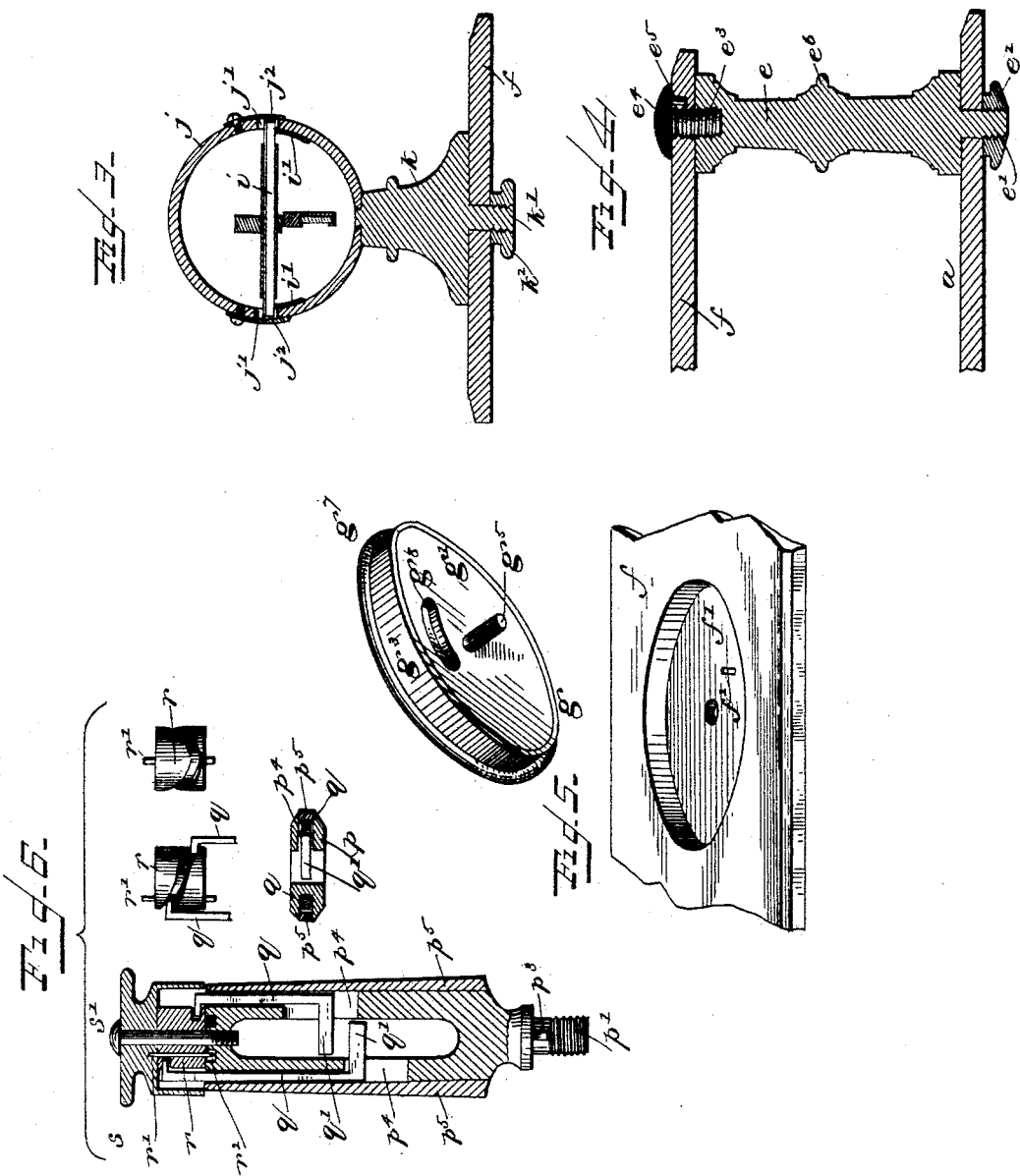
WITNESSES.
Franck L. Ouraud
Edwin A. Finckel
INVENTOR.
Calvin H. Fitch,
by Wm. H. Finckel,
Attorney.

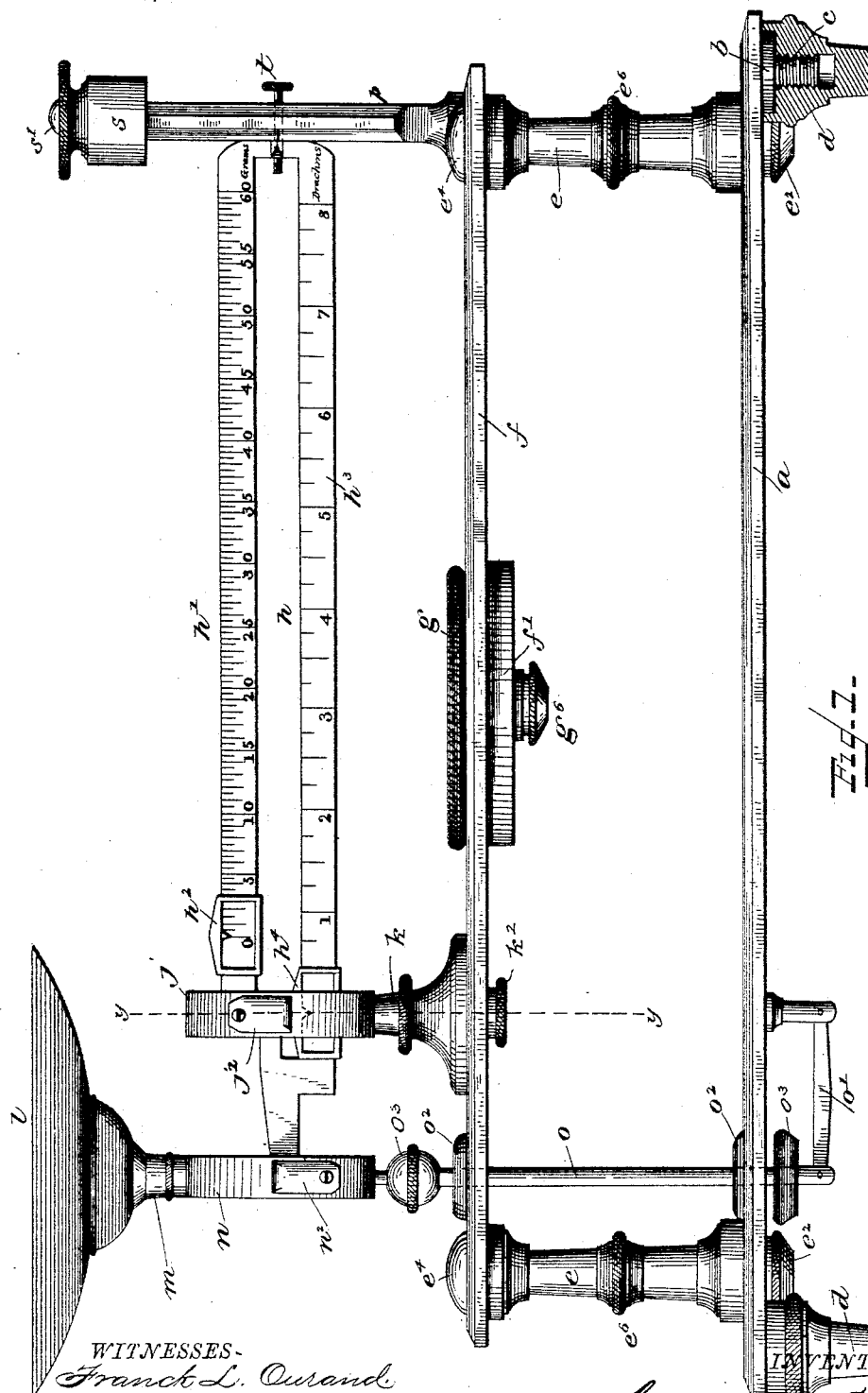

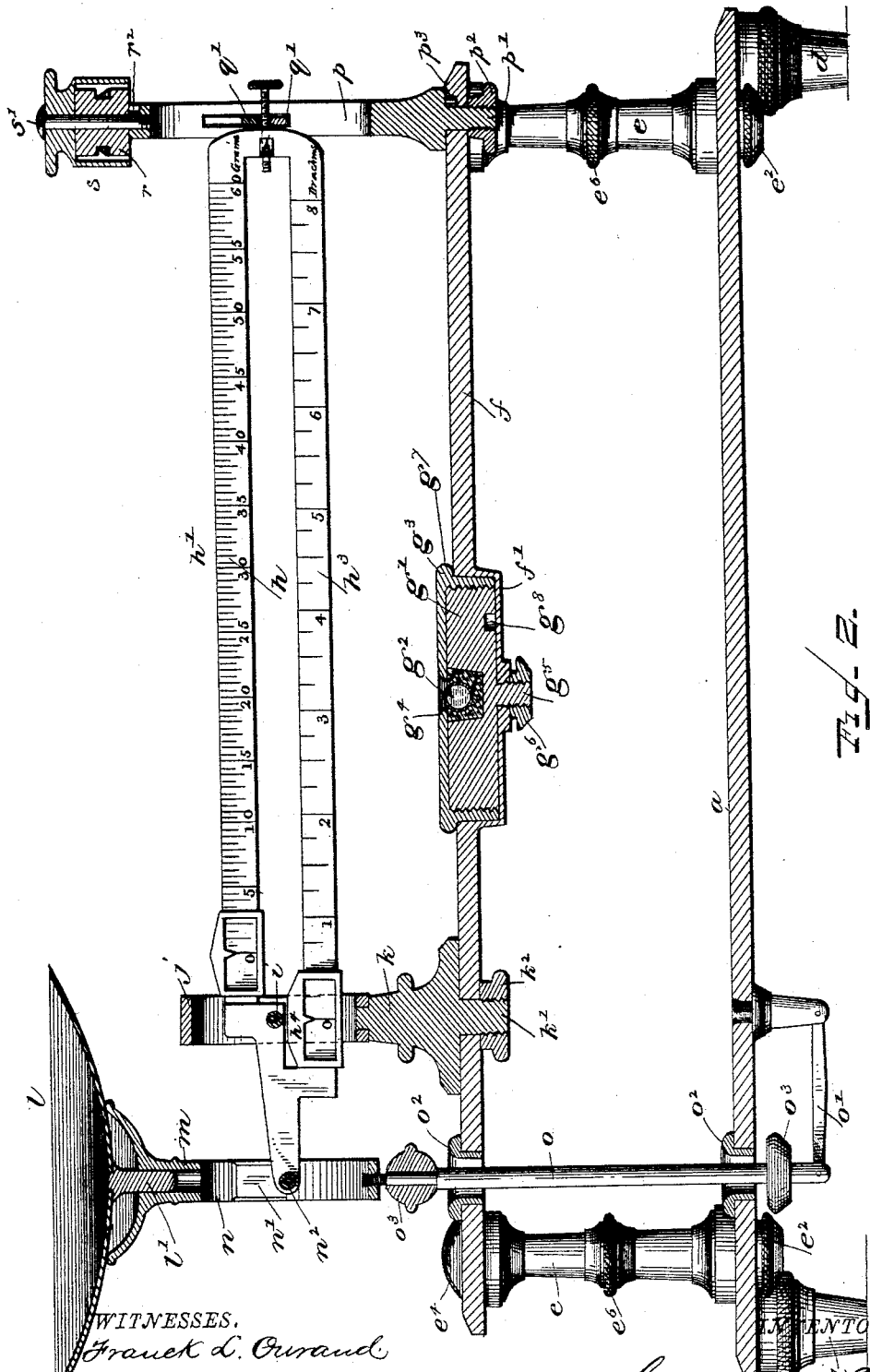

UNITED STATES PATENT OFFICE.

CALVIN H. FITCH, OF POULTNEY, VERMONT.

PRESCRIPTION-WEIGHING SCALE.

SPECIFICATION forming part of Letters Patent No. 384,247, dated June 12, 1888.

Application filed July 15, 1887. Serial No. 244,394. (No model.)

*To all whom it may concern:*

Be it known that I, CALVIN H. FITCH, a citizen of the United States, residing at Poultney, in the county of Rutland and State of Vermont, have invented certain new and useful Improvements in Prescription-Scales, of which the following is a full, clear, and exact description.

The object of this invention is to provide an accurate, compact, and attractive prescription-scale for druggists, in which small quantities may be accurately weighed without the use of detached weights.

Another object is to so construct the scale, as upon the "knockdown" principle, that it may be disassembled and its parts packed in small compass for transportation, and the scales thereafter accurately set up or assembled for use; and still another object is to provide means for leveling the scales.

With these objects in view the invention consists in the details of construction and in certain combinations, as hereinafter more particularly set forth and claimed.

In the accompanying drawings, in the several figures of which like parts are similarly designated, Figure 1 is a side elevation; Fig. 2, a vertical section with the beam in elevation. Fig. 3 is a section in the plane of line $yy$ of Fig. 1. Fig. 4 is a vertical section through one of the posts. Fig. 5 is a perspective view of the spirit-level, and Fig. 6 shows in section an elevation of details of the beam-locking device.

The foundation or base plate $a$ may be a piece of brass or other metal shaped in dies or otherwise, and provided at its four corners with bosses $b$ and screws $c$, which bosses and screws receive legs or feet $d$, having milled collars, whereby the said legs may be adjusted toward and from the said base-plate to level the said base-plate with respect to the surface upon which it is placed, the bosses $b$ fitting within recesses in the upper ends of the legs, so that the legs may have a positive bearing upon the said bosses at all ordinary adjustments thereof with relation to the base-plate, and thereby insure a steadiness of the legs.

Four posts, $e$, are supported upon the four corners of the upper surface of the base-plate $a$, and these posts receive and support the upper bearing-plate, $f$, which latter may also be formed in substantially the same manner and of the same material as the base-plate. Referring to Fig. 4, these several posts $e$ have at their lower ends a screw, $e'$, projecting through the base-plate and engaged on the under side of the said base-plate by a nut, $e^2$, and at their upper ends are provided with screw-threaded sockets $e^3$, which engage screws $e^4$, the heads whereof rest upon the upper bearing-plate, $f$, and are prevented from rotating by pins $e^5$ engaging holes in the upper surface of said bearing-plate. The posts are provided with milled collars $e^6$. The screws $e'$ and the screw-sockets $e^3$ may be rights and lefts, so that when the posts are rotated they will disengage themselves from both the nuts $e^2$ and the screws $e^4$ to permit the separation of the plates $a$ and $f$.

The plate $f$ is provided with a pocket, $f'$, in which is arranged a circular rotating spirit-level, $g$. The construction of this level is shown in detail in Figs. 2 and 5.

$g'$ is a block of metal or other material screw-threaded externally and provided interiorly, and substantially in the line of its diameter, with an ordinary level or bubble tube, $g^2$. This block $g'$ receives a screw-threaded cap, $g^3$, in which is a leveling sight, $g^4$. The block $g'$ is provided with a screw, $g^5$, which projects through the pocket $f'$, and is engaged by a nut, $g^6$, whereby the said level may be rotated within its pocket to ascertain both the transverse and longitudinal horizontality of the scales. The upper edge, $g^7$, of the cap $g^3$ may be milled to provide a hand-grasp for rotating the level. The rotation of the level may be limited to bringing the bubble-tube into two positions, which are at right angles to each other, and for this purpose the under side of the block $g'$ may be provided with a groove, $g^8$, into which a stop-pin, $f^2$, in the pocket $f'$ may be projected.

It will be observed that scales provided with these leveling-feet and with the spirit-level may be always set perfectly true, no matter how irregular the counter may be upon which they are placed. And this is a very important feature, in that by it the beam will always be preserved in a true position, and there will be no binding of its knife-edges in their bearings, nor will there be any friction of the beam itself against any portion of the frame in which it is hung. The beam $h$ in the instance herein shown consists of an upper member, $h'$, graduated to grains and half-grains, and provided with a permanently-attached counterpoise, $h^2$, adapted to be slid along the beam, and a second member, $h^3$, graduated into drams and quarters, and having its zero-point in vertical alignment with the knife-edges of the beam. This member $h^3$ is also provided with a sliding permanently-attached counterpoise, $h^4$. By arranging the zero-point of the lower member of the beam immediately under the knife-edges of the beam I am enabled to secure absolute accuracy in weighing with a beam having two scales and supporting members, and still having these two members of the beam practically one beam.

It will be observed that the two members $h'$ and $h^3$ of the beam are rigidly connected at both ends.

The knife-edge $i$ of the beam is supported upon steel plates $i'$ $i'$ in a circular yoke or bearing, $j$. (See Fig. 3.) This yoke $j$ is pierced diametrically with openings $j'$ $j'$ opposite the bearings $i'$ $i'$, and these openings are covered by swinging caps $j^2$ $j^2$. When it is desired to place the beam in its bearings, one of the caps $j^2$ is swung aside and the knife-edge $i$ is passed through the opening $j'$ sufficiently to permit the opposite end of the knife-edge to be set in its bearing $i'$ and extended into the opening $j'$, and when so extended and its end comes substantially in contact with the cap $j^2$ at that end, then the cap of the opposite opening may be swung down and fastened over said opening, thus confining the knife-edge upon its bearings and within the opening, and preventing endwise movement of the knife-edge in its bearings, and at the same time covering up and protecting the said knife-edge.

The yoke $j$ may be made by slitting a tubular piece of metal in rings of the proper width, and thereafter boring the diametrical openings. In this way the bearings for the beam may be very economically manufactured. The yoke $j$ is supported upon the bearing-plate $f$ by a post, $k$, which post has a downwardly-projecting screw, $k'$, extended through the plate $f$ and engaged by the nut $k^2$.

The scale-pan $l$ is made with a standard, $l'$, whereby the said pan may be fitted in its socket $m$; and this socket may be, and preferably is, in order to prevent lodgment of dust, an open-ended tube arranged upon the top of the yoke $n$, which is constructed with steel bearings $n'$, caps $n^2$, and diametrically-opposite openings for the reception of the knife-edge $n^3$ of the scale-beam, to support the scale-pan. The bearing-edges of the knife-edges $i$ and $n^3$ are reversed, of course, and they are in the same horizontal plane when the scale is *in equilibrio*. The yoke $n$ is connected by the rod $o$ with a steadying-lever, $o'$, pivoted to the under side of the base-plate $a$ in any usual manner, the rod $o$ passing through suitably-bushed openings $o^2$ $o^2$ in the plates $f$ and $a$; and this said rod $o$ may be provided with any suitable counterpoises, $o^3$ $o^3$, to balance the beam.

The free end of the beam projects into the slotted post $p$, secured to the forward end of the plate $f$ by a screw, $p'$, and nut $p^2$, and held against rotation by a pin, $p^3$, engaging a hole or socket in the upper surface of the plate $f$. This post $p$ in the process of its manufacture is provided with slits or kerfs $p^4$ in the longitudinal side walls of its slot, in which slits or kerfs are arranged oppositely-moving beam-locking devices $q$, and thereafter these kerfs are practically covered up by inserted strips $p^5$. These beam-locking devices are engaged by a serpentine cam, $r$, mounted to rotate upon the top of the post $p$ and provided with a surrounding cover or cap and a rotating device, $s$, the two being united to the post by a rivet or screw, $s'$; and the cam $r$ and cap $s$ being united to one another so as to turn together by a pin, $r'$, which also serves the additional purpose of a stop by playing in a semicircular groove, $r^2$, in the top of the post $p$. (See Figs. 2 and 6.) It will be observed that as the cam $r$ is rotated the active ends $q'$ $q'$ of the beam-locking device will be caused to approach toward or recede from each other, and their limit of approach is arranged in line with the active edge of the knife-edge $i$, so as to hold the beam in a true horizontal position. The beam co-operates with these beam-locking devices by means of a screw, $t$, set in the free end of the beam and passing between opposite edges of the active ends $q'$ of the beam-locking devices. This screw $t$ subserves the additional purpose of a counterpoise or equalizer for the beam, for by adjusting it back and forth in its bearing in the beam the length of the beam, and consequently its weight as a lever, are increased or diminished. The cam $r$ effects the complete movement of the beam-locking devices by about a quarter or nearly half turn, and thus the beam may be very readily and very quickly rendered rigid and immovable. This is a decided advantage in this class of scales where the knife-edges are necessarily fine, and the vibration of the beam, if left unrestrained, wears rapidly upon the knife-edges, and hence destroys the accuracy of the balance.

I desire to call attention to the facilities for disassembling the scale in order to pack it for transportation. The pan $l$ is simply lifted from its socket, when the yoke $n$ and its counterpoises are readily detached. The yoke $i$, with its post or standard, is readily detached from the plate $f$. The beam $h$ is readily lifted out of its yoke and disconnected from the post $p$. The post $p$, with its appurtenances, is removable bodily from the plate $f$ by removing the nut $p^2$, and the plates $a$ and $f$ are disconnected by rotation of the posts $e$.

Scales thus constructed may be arranged within any suitable protecting-case.

What I claim is—

1. A prescription-scale comprising a pan and a beam provided with the permanently-fixed sliding weights, a bearing-plate, a post to which the beam is pivoted and which is detachably connected to the said bearing-plate, a foundation-plate, and removable posts interposed between the foundation-plate and bearing-plate to render the former detachable from the bearing-plate, whereby the parts of the scale may be readily disassembled and the scales "knocked down" for storage and transportation, substantially as described.

2. A foundation-plate provided with leveling-feet, a bearing-plate, and detachable posts connecting the two plates, and a spirit-level arranged in the upper plate and rotatable therein, so as to be brought lengthwise and crosswise of the plate, to ascertain the level of said plate longitudinally and transversely, combined with a scale-pan, a scale-beam, and bearings therefor arranged upon the bearing-plate, substantially as described.

3. A scale having a rotary spirit-level consisting of a block provided with a bubble-tube, a cap connected with said block by screw-threads, and having a sight for the bubble-tube, and the bearing-plate of the scales having a pocket in which the level is arranged, substantially as described.

4. A scale-beam having two rigidly-connected or integral graduated members, with the zero-point of the lower member in vertical alignment with the knife-edge of the beam, and provided with permanently-affixed sliding weights, combined with such knife-edge, bearings therefor, and a scale-pan and its counterpoises, substantially as described.

5. The post provided with oppositely-moving beam-locking devices, a cam for moving said devices, and a cap covering the same and adapted to rotate it, substantially as described.

6. A post having longitudinal recesses or kerfs, combined with oppositely-moving beam-locking devices, a serpentine cam engaging said beam-locking devices, and means to rotate said cam to grasp and release the beam, substantially as described.

7. A scale-beam having an equalizing device in the form of a screw arranged at its free end, combined with a post and beam-locking devices co-operating with said equalizing device, and means to move said devices toward and from said equalizing device, substantially as described.

In testimony whereof I have hereunto set my hand this 13th day of July, A. D. 1887.

CALVIN H. FITCH.

Witnesses:
MARTIN D. COLE,
A. H. VARNEY.